United States Patent
Boos et al.

(10) Patent No.: US 9,513,631 B2
(45) Date of Patent: *Dec. 6, 2016

(54) METHOD FOR CONTROLLING THE DRIVING OF A MOTOR VEHICLE AND DRIVE CONTROL SYSTEM

(71) Applicant: Robert Bosch Automotive Steering GmbH, Schwaebisch Gmuend (DE)

(72) Inventors: Nicolas Boos, Mutlangen (DE); Joerg Strecker, Pluederhausen (DE)

(73) Assignee: Robert Bosch Automotive Steering GmbH, Schwaebisch Gmuend (DE)

( * ) Notice: Subject to any disclaimer, the term of this patent is extended or adjusted under 35 U.S.C. 154(b) by 0 days.

This patent is subject to a terminal disclaimer.

(21) Appl. No.: 14/594,307

(22) Filed: Jan. 12, 2015

(65) Prior Publication Data

US 2015/0197278 A1 Jul. 16, 2015

(30) Foreign Application Priority Data

Jan. 14, 2014 (DE) .......................... 10 2014 100 332
Jun. 17, 2014 (DE) .......................... 10 2014 108 486

(51) Int. Cl.
*G05D 1/00* (2006.01)
*B62D 13/06* (2006.01)
*B62D 15/02* (2006.01)
*G06F 3/0484* (2013.01)
*G06F 3/0488* (2013.01)
*B62D 1/00* (2006.01)

(52) U.S. Cl.
CPC .............. *G05D 1/0044* (2013.01); *B62D 1/00* (2013.01); *B62D 13/06* (2013.01); *B62D 15/0285* (2013.01); *G06F 3/04847* (2013.01); *G06F 3/04883* (2013.01); *G05D 2201/0213* (2013.01)

(58) Field of Classification Search
CPC ............ B62D 1/00; B62D 6/00; B62D 13/00; B62D 13/06; B62D 15/0285; G05D 1/0044; G05D 2201/0213; G06F 3/04847; G06F 3/0488; G06F 3/04883
See application file for complete search history.

(56) References Cited

U.S. PATENT DOCUMENTS

| 7,225,891 | B2 | 6/2007 | Gehring et al. |
| 2005/0000738 | A1 | 1/2005 | Gehring et al. |
| 2005/0131603 | A1* | 6/2005 | Liu ........................ B60R 1/025 701/36 |

(Continued)

FOREIGN PATENT DOCUMENTS

| DE | 103 22 828 | 1/2005 |
| DE | 10 2005 045 196 | 9/2006 |

(Continued)

*Primary Examiner* — Jerrah Edwards
*Assistant Examiner* — Tamara Weber
(74) *Attorney, Agent, or Firm* — Jordan and Koda, PLLC

(57) ABSTRACT

A method for remotely controlling a motor vehicle, wherein the motor vehicle comprises a steering system and a drive train, which can both be electronically actuated by control means of the motor vehicle and by way of which the motor vehicle can be driven automatically. The control means of the motor vehicle have a wireless communication link to the touchscreen device so that automatic driving of the motor vehicle can be remotely controlled by way of the touchscreen device.

3 Claims, 2 Drawing Sheets

(56) References Cited

U.S. PATENT DOCUMENTS

| | | | |
|---|---|---|---|
| 2013/0024049 A1* | 1/2013 | Yoshioka | B62D 1/00 701/2 |
| 2013/0047112 A1* | 2/2013 | Waller | B60H 1/00985 715/771 |
| 2013/0179038 A1* | 7/2013 | Goswami | B62D 13/005 701/42 |
| 2014/0032031 A1* | 1/2014 | Okamura | B62D 15/0285 701/23 |
| 2014/0085111 A1* | 3/2014 | Faber | B62D 15/027 340/932.2 |
| 2014/0121883 A1* | 5/2014 | Shen | B62D 15/0285 701/28 |
| 2014/0129091 A1* | 5/2014 | Yamazaki | B62D 5/0496 701/42 |
| 2014/0309834 A1* | 10/2014 | Choi | B62D 15/0285 701/23 |
| 2014/0324310 A1* | 10/2014 | Kobayashi | B62D 15/0285 701/70 |
| 2015/0002669 A1* | 1/2015 | Reed | G07C 5/0808 348/148 |
| 2015/0039173 A1* | 2/2015 | Beaurepaire | B60W 30/06 701/23 |

FOREIGN PATENT DOCUMENTS

| | | |
|---|---|---|
| DE | 10 2006 002 294 | 7/2007 |
| GB | 2 398 048 | 8/2004 |
| WO | WO-2010/006981 | 1/2010 |

* cited by examiner

METHOD FOR CONTROLLING THE DRIVING OF A MOTOR VEHICLE AND DRIVE CONTROL SYSTEM

BACKGROUND OF THE INVENTION

The invention relates to a method for controlling the driving of a motor vehicle. The invention likewise relates to a touchscreen device and to a drive control system.

A variety of methods exist to assist a driver with maneuvering a vehicle, in particular a motor vehicle, having no trailer. Some methods broaden the field of vision of the driver by way of park distance control systems, cameras or the like. In other methods, individual driving tasks are taken over from the driver during maneuvering, in particular when parking the vehicle in parking spaces. If the driver and the vehicle also share the longitudinal and transverse guidance of the vehicle in a parking steering system, the entire task of driving is taken over from the driver during autonomous parking. The driver is then only responsible for activating and deactivating the parking process.

WO 2010/006981 A1 relates to a garage assistance system for assisting the driver with parking a vehicle in a garage or a parking space. The assistance system comprises a surroundings sensor system for automatically detecting the spatial conditions and a remote control unit for activating a parking process. The parking process is visually transmitted to a mobile terminal via an interface and can be observed there on a display.

Existing methods for assisting the driver with maneuvering a motor vehicle generally focus on parking the motor vehicle in a clearly defined, and therefore measurable, parking position (for example, a parking space or a parking box between other vehicles or objects). Moreover, the existing methods are generally dependent on additional sensors (such as a camera, ultrasound or the like).

Methods are also known already for assisting the driver with the maneuvering of a big rig comprising a tractor unit and a trailer.

DE 10 2005 045 196 A1 relates to a device for assisting the driver of a tractor unit during back-up maneuvers of a big rig composed of a tractor unit and a trailer coupled to the tractor unit. The device comprises the following components: a camera, which can be mounted in the rear area of the trailer and by way of which an image of a surroundings area of the trailer located in the reverse driving direction can be captured; a steering angle sensor, by way of which a wheel steering angle of steerable wheels of the tractor unit can be detected; and/or an articulation angle sensor, by way of which an articulation angle between the longitudinal axes of the trailers and of the vehicle can be detected; and a simulation computer, in which a trajectory of at least one reference point of the trailer can be calculated from the wheel steering angle and/or the articulation angle; and a display device, by way of which the camera image can be represented; wherein the trajectory of the reference point of the trailer calculated by way of the simulation computer can be superimposed on the camera image.

In GB 2 398 048 A the surroundings of a big rig are detected by way of a camera which indicates to the driver, on a touchscreen device, what kind of steering is required to reach a selected target position.

Moreover, DE 103 22 828 A1 relates to a control system for a big rig comprising a tractor unit and a trailer, wherein the tractor unit is equipped with an electronically actuatable drive train.

Known methods for assisting the driver in the maneuvering of a big rig generally focus only on one of the two challenges that exist when backing up a trailer, these being either the limited view or the complex transverse dynamics. In addition, the majority of existing methods have the drawback that the trailer must be equipped with an additional sensor system (such as cameras or the like), which results in increased manufacturing costs.

SUMMARY OF THE INVENTION

Proceeding from this, it is the object of the present invention to create a method for controlling the driving of a motor vehicle of the type mentioned at the outset, which avoids the drawbacks of the prior art, and in particular makes it easier for a driver to maneuver into a position that cannot be measured or is difficult to measure and/or to take the complex transverse dynamics into consideration when using the motor vehicle as the tractor unit of a big rig, wherein the driver is to be granted an optimal overview of the surroundings of the motor vehicle or of the big rig, and which is not dependent on additional sensors or actuators of the motor vehicle or of the big rig, but manages with the existing sensors and actuators of the motor vehicle or of the big rig.

This object is achieved according to the invention by a method for controlling the driving of a motor vehicle, wherein the motor vehicle comprises a steering system and a drive train, which can both be electronically actuated by control means of the motor vehicle and by way of which the motor vehicle can be driven automatically, and wherein the control means of the motor vehicle have a wireless communication link to a touchscreen device so that automatic driving of the motor vehicle can be remotely controlled by way of the touchscreen device.

In an advantageous embodiment, the motor vehicle can be a tractor unit of a big rig, to which one or more trailers are coupled, in particular in series, wherein the control means of the tractor unit have a wireless communication link to a touchscreen device so that automatic driving of the big rig can be remotely controlled by way of the touchscreen device, during which at least one articulation angle between a longitudinal axis of the tractor unit and a longitudinal axis of the trailer is continuously regulated.

In the method according to the invention, the driver advantageously remotely steers the motor vehicle or the big rig by way of a touchscreen device or a touchscreen unit, in particular a smart phone, tablet PC or the like. Since he is able to leave the motor vehicle or the tractor unit and control the motor vehicle or the big rig from outside, he can gain an optimal overview of the surroundings of the motor vehicle or of the big rig during maneuvering. Additionally, the automatic regulation of the articulation angle relieves the driver of considering the complex transverse dynamics of a big rig or considerably facilitates the same. Moreover, no additional sensor system or actuator system is required on the trailer. The method manages with the existing sensor system and actuator system of the motor vehicle.

It is advantageous if the motor vehicle, a portion of the motor vehicle, or the big rig is graphically represented on the touchscreen of the touchscreen device, in particular in a top view from above. The motor vehicle, a portion of the motor vehicle, or the big rig can be virtually represented on the touchscreen device, in particular stylistically, preferably from a bird's eye view, so as to facilitate the driver's orientation. The driver can thus easily align the touchscreen device so that the virtual big rig or motor vehicle is aligned in accordance with the real big rig or motor vehicle.

Prior to starting to drive, a driving direction and/or a driving speed of the big rig or of the motor vehicle can be predefined on the touchscreen of the touchscreen device. Prior to starting to drive, it is thus possible for the driver to specify the driving direction (reverse or forward) and the driving speed by way of the touchscreen device.

The motor vehicle can comprise at least one transceiver system, which is electrically connected to the control means of the motor vehicle and which is suitable for communicating with a transceiver system of the touchscreen device.

It is advantageous if the graphical representation of the motor vehicle or of the big rig on the touchscreen of the touchscreen device comprises at least one active part and at least one passive part. When the big rig is being backed up, the at least one active part on the touchscreen of the touchscreen device can be a trailer, and the at least one passive part can be the tractor unit, or a further trailer if multiple trailers are present in the big rig. When the motor vehicle is being backed up, the at least one active part can be a rear region of the motor vehicle, and the at least one passive part can be a front region of the motor vehicle.

When the big rig is being driven forward, the at least one active part on the touchscreen of the touchscreen device can be tractor unit, and the at least one passive part can be at least one trailer.

When the motor vehicle is being driven forward, the at least one active part can be a front region, and the at least one passive part can be a rear region of the motor vehicle.

When a user touches the at least one active part on the touchscreen of the touchscreen device, the touchscreen device can remotely control the control means of the motor vehicle or of the tractor unit so that the motor vehicle or the tractor unit is set in motion in a predefined driving direction, and in particular at a predefined driving speed.

By laterally displacing the at least one active part on the touchscreen of the touchscreen device, a user can predefine a lateral movement direction of the motor vehicle or of the big rig, in particular in the form of a target articulation angle, in particular between the at least one active part and the at least one passive part, or the longitudinal axes thereof.

Thus, when the driver touches the active part of the big rig on the touchscreen (trailer for reverse and tractor unit for forward), the big rig is set in motion at the preselected driving speed, and by displacing the active part of the big rig, the driver can predefine the articulation angle, and thus the lateral movement direction.

A target articulation angle between the at least one active part and the at least one passive part can be calculated from a lateral position of the displaced active part on the touchscreen of the touchscreen device, applying: the lateral position of the displaced active part/maximal lateral position of the displaced active part=target articulation angle/maximal articulation angle. The target articulation angle can thus alternatively be calculated from the lateral position of the displaced active part of the big rig on the touchscreen device by keeping the ratio of the target articulation angle to the maximally allowed articulation angle identical to the ratio of the lateral position to the maximal lateral position.

During driving, a user can set a driving speed by longitudinally displacing the at least one active part on the touchscreen of the touchscreen device. The driver can thus also predefine only the driving direction before starting to drive. Then, during driving, the driver can predefine or set the lateral movement direction or the articulation angle by laterally displacing the active part of the motor vehicle or of the big rig, and the driving speed by longitudinally displacing the active part of the motor vehicle or of the big rig.

When the user ceases to touch the at least one active part, the control means of the motor vehicle or of the tractor unit can be actuated by the touchscreen device so that the motor vehicle or the tractor unit is stopped immediately. When the driver no longer touches the active part of the motor vehicle or of the big rig on the touchscreen device, the motor vehicle or the big rig stops immediately, in particular for safety reasons.

These measures minimize the demands on the driver with regard to longitudinal dynamics, and notably transverse dynamics. The target articulation angle corresponds to the articulation angle set on the touchscreen device by displacement of the active part of the big rig and can thus be read.

The electronically actuatable drive train of the motor vehicle or of the tractor unit can comprise at least one brake system, a transmission, and a drive assembly, in the present example. The steering system can also be assigned to the electronically actuatable drive train of the motor vehicle.

The control means of the motor vehicle or of the tractor unit can transmit at least one activation status to the touchscreen device. At least one predefined driving direction, a predefined driving speed, and an activation status can be transmitted from the touchscreen device to the control means of the motor vehicle or of the tractor unit. In the case of a tractor unit, a target articulation angle can additionally be transmitted from the touchscreen device to the control means of the tractor unit. In the case of a single motor vehicle, the target steering angle can additionally be transmitted from the touchscreen device to the control means of the motor vehicle. The touchscreen device thus sends at least the preselected driving direction (forward or reverse), the preselected driving speed, the target articulation angle, and the activation status to the motor vehicle or the tractor unit. The motor vehicle or the tractor unit sends at least the activation status to the touchscreen device. The preselected driving speed is set automatically by way of the drive assembly or the engine (such as electronic throttle control) and the brake system (such as ESP) of the motor vehicle or of the tractor unit; alternatively, it is also possible to use only the brake and idle for this purpose. The preselected driving direction can be set automatically by way of the transmission of the motor vehicle or of the tractor unit.

The at least one articulation angle can be regulated automatically while driving by way of the steering system of the tractor unit. The articulation angle can thus be set automatically by the steering system of the tractor unit (such as EPS/electric power steering or AFS/adaptive front steering). An algorithm can be used for this purpose, which is composed of pre-control to a stable articulation angle and regulation to the desired articulation angle, as is described in DE 10 2006 002 294 A1, for example.

The current articulation angle can be detected by a sensor. This can be carried out by way of a special trailer hitch comprising an articulation angle sensor system or an alternative sensor system (such as camera, radar, lidar, ultrasound, GSP receiver in trailer and tractor unit).

While the big rig is being driven, the at least one articulation angle can be limited so as to avoid a collision between the trailer and tractor unit and/or so as to avoid an articulation angle being reached which can no longer be reduced without altering the driving direction.

The big rig can comprise multiple trailers, wherein additionally at least one articulation angle between the longitudinal axes of the respective trailers that are coupled to each other can be continuously regulated when the big rig is driven automatically.

Optionally, collision of the motor vehicle or of the tractor unit with an obstacle can be avoided during driving by way of the surroundings sensor system of the motor vehicle or of the tractor unit (such as a camera, radar, lidar, ultrasound or the like). In the event of an imminent collision, interruption or disturbance of the wireless connection, or failure of an actuator system that is required, the big rig can be immediately stopped. Optionally, additional information (such as actual and target variables, as well as warnings) can be represented for the driver on the touchscreen device and/or output via a speaker of the touchscreen device.

An exemplary embodiment of the invention will be described schematically hereafter based on the drawings.

DETAILED DESCRIPTION OF THE PREFERRED EMBODIMENTS

Figure 1:
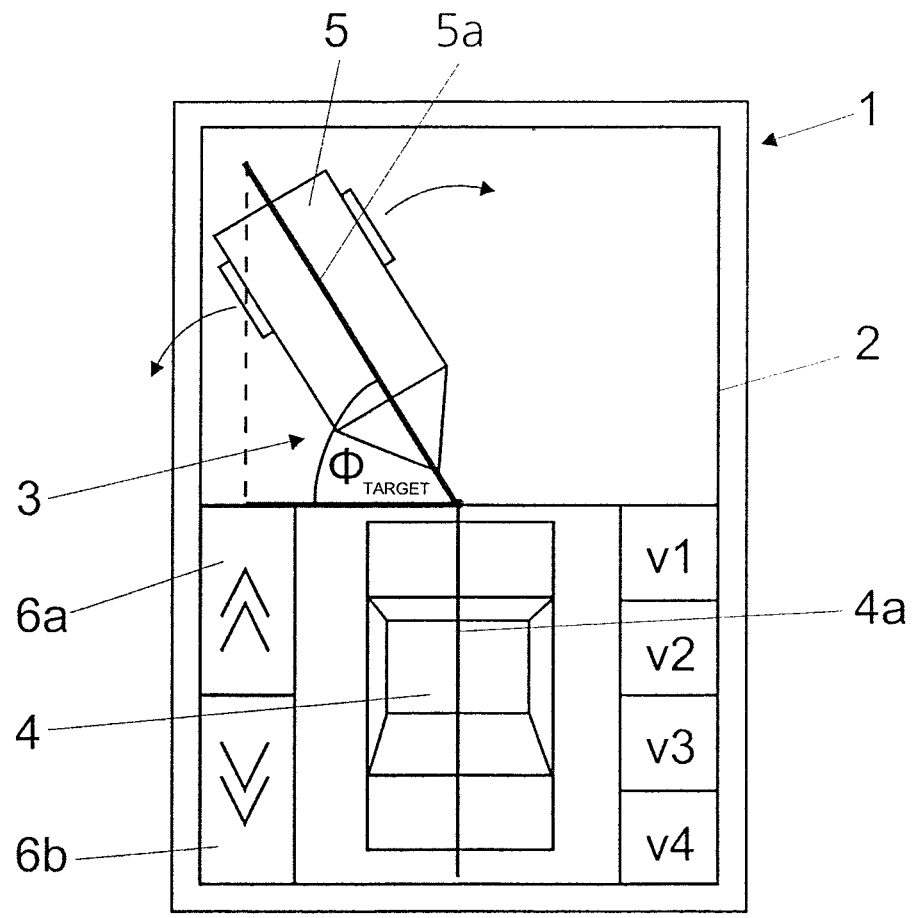
FIG. 1 shows a simplified illustration of a touchscreen device for use in a method according to the invention.

FIG. 1 shows a touchscreen device 1 including a touchscreen 2 for use in a method according to the invention for controlling the driving of motor vehicle as a tractor unit 4 or a tractive motor vehicle in a big rig 3, comprising the tractor unit 4 and one or more trailers 5 coupled to the tractor unit 4.

In further exemplary embodiments, which are not shown, it is also possible to control the driving of a single motor vehicle having no trailer 5 using the method according to the invention.

The big rig 3 is graphically represented as a top view from above on the touch screen 2 of the touchscreen device 1.

The big rig 3 composed of the tractor unit 4 and the trailer 5 is virtually indicated only on the touchscreen 2 in the figures. The actual big rig to be remotely controlled is not shown in the figures.

In the method according to the invention, the tractor unit 4 comprises a steering system and a drive train, which can both be electronically actuated by control means of the tractor unit 4 and by way of which the tractor unit 4 can be driven automatically, wherein the control means of the tractor unit 4 have a wireless communication link to the touchscreen device 1 so that automatic driving of the big rig 3 can be remotely controlled by way of the touchscreen device 1, during which at least one articulation angle between a longitudinal axis 4a of the tractor unit 4 and a longitudinal axis 5a of the trailer 5 is continuously regulated. As is indicated in FIG. 1 by the areas 6a and 6b, a driving direction 6a, 6b of the big rig 3 can be predefined on the touchscreen 2 of the touchscreen device 1 prior to starting to drive. Moreover, driving speed levels of the big rig 2 can be predefined on areas v1 to v4 of the touchscreen 2.

The touchscreen device 1, in conjunction with the tractor unit 4 or the control means thereof, forms a drive control system for the big rig 3.

The tractor unit 4 comprises at least one transceiver system (not shown), which is electrically connected to the control means (not shown) of the tractor unit 4 and which is suitable for communicating with a transceiver system (likewise not shown) of the touchscreen device 1.

The graphical representation of the big rig 3 on the touchscreen 2 of the touchscreen device 1 includes an active part 5 and a passive part 4.

In the present example, the big rig 3 is being backed up, wherein the active part on the touchscreen 2 of the touchscreen device 1 is the trailer 5 and the passive part is the tractor unit 4. In a further exemplary embodiment, which is not shown, the at least one passive part can be a further trailer 5, if multiple trailers 5 are present.

When the motor vehicle having no trailer 5 is being backed up, the at least one active part can be a rear region of the motor vehicle, and the at least one passive part can be a front region of the motor vehicle (not shown).

Moreover, when the big rig 3 is being driven forward, the at least one active part on the touchscreen 2 of the touchscreen device 1 can be the tractor unit 4, and the at least one passive part can be the at least one trailer 5 (not shown). When the motor vehicle having no trailer 5 is being driven forward, the at least one active part can be a front region, and the at least one passive part can be a rear region of the motor vehicle (not shown).

When a user touches the active part 5 on the touchscreen 2 of the touchscreen device 1, the touchscreen 1 device remotely controls the control means of the tractor unit 4 so that the big rig 3 is set in motion in a predefined driving direction 6a, 6b, in particular at a predefined driving speed v1 to v4.

By laterally displacing the active part 5 on the touchscreen 2 of the touchscreen device 1, a user can predefine a lateral movement direction of the big rig 3, in particular in the form of a target articulation angle $\phi_{TARGET}$ between the active part 5 and the passive part 4. The target articulation angle $\phi_{TARGET}$ corresponds to the angle set on the touchscreen 2 by displacement of the active part 5 of the big rig 3 and can thus be read. The articulation angle that is defined is typically the angle between the longitudinal axes of the tractor unit 4 and of the at least one trailer 5. This definition is also used in the present invention. In the present exemplary embodiment, the target articulation angle $\phi_{TARGET}$ is indicated relative to a transverse axis of the tractor unit 4 and must therefore still be modified, which is to say increased by 90°, so as to arrive at the articulation angle.

Figure 2:
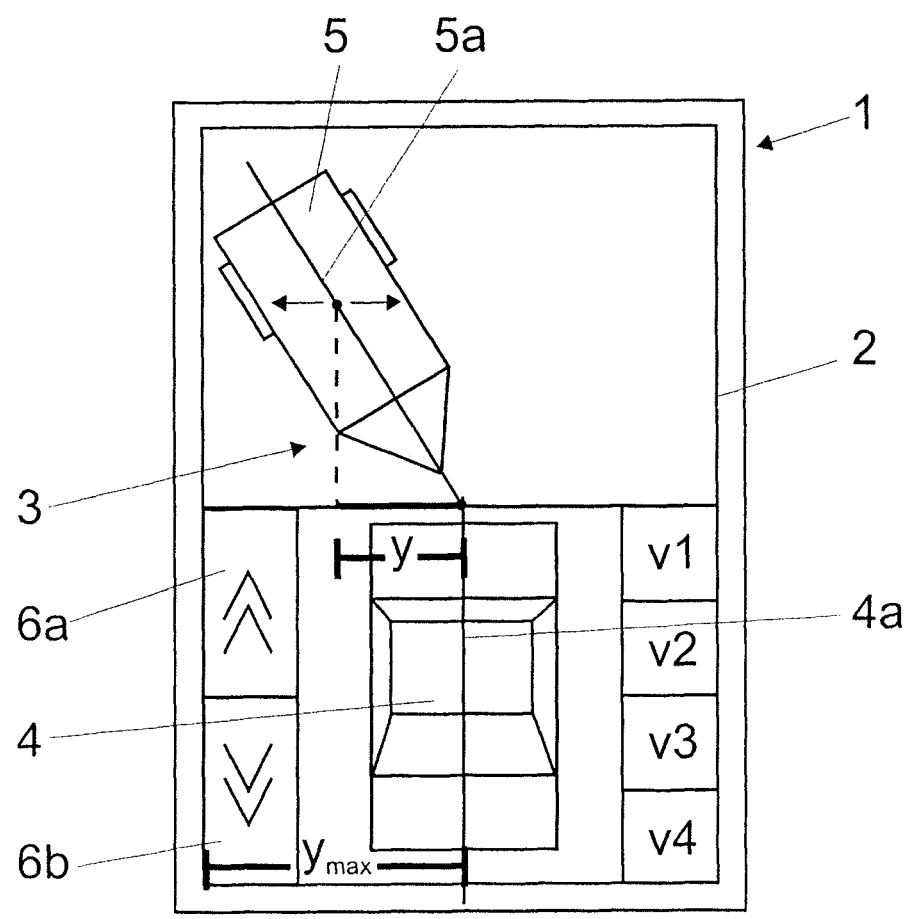
FIG. 2 shows another simplified illustration of the touchscreen device shown in FIG. 1.

As an alternative or in addition, the target articulation angle $\phi_{TARGET}$ between the active part 5 and the passive part 4 can be calculated from a lateral position y of the displaced active part 5 on the touchscreen 2 of the touchscreen device 1, wherein the following applies: lateral position y of the displaced active part 5/maximal lateral position $y_{max}$ of the displaced active part 5=target articulation angle $\phi_{TARGET}$/maximal articulation angle (see FIG. 2).

Functionally equivalent elements are denoted by identical reference numerals in FIGS. 1 and 2.

As an alternative or in addition, during driving, a user can set a driving speed by longitudinally displacing the at least one active part 5 on the touchscreen 2 of the touchscreen device 1.

If the user no longer touches the at least one active part 5, the control means of the tractor unit 4 are actuated by the touchscreen device 1 so that the tractor unit 4 is stopped immediately.

When a communication link is present between the control means of the tractor unit 4 and the touchscreen device 1, at least one activation status can be transmitted from the control means to the touchscreen device 1. At least one predefined driving direction 6a, 6b, a predefined driving speed v1 to v4, a target articulation angle $\phi_{TARGET}$ and an activation status can be transmitted from the touchscreen device 1 to the control means of the tractor unit 4.

The big rig 3 can comprise multiple trailers 5, wherein additionally at least one articulation angle between the longitudinal axes 5a of the respective trailers 5 that are coupled to each other can be continuously regulated while the big rig 3 is driven automatically. It is thus also possible to remotely control big rigs 3 comprising multiple trailers (such as the EuroCombi or the like). The control process could then be configured in such a way that the operator predefines the movement direction (transverse) of the big rig 3 by displacing the last trailer 5 when backing up, and by displacing the tractor unit 4 when driving forward. During backing up, the driver thus predefines the articulation angle between the last and second-to-last trailers 5, and the system sets all the articulation angles accordingly, so that the desired articulation angle is created between the last and second-to-last trailers 5.

The at least one articulation angle can be limited while the big rig 3 is being driven. In this way, a collision between the trailer 5 and tractor unit 4 can be effectively avoided. Moreover, it is also avoided that an articulation angle is reached which can no longer be reduced without altering the driving direction.

The at least one articulation angle can be regulated automatically while driving by way of a steering system of the tractor unit 4.

The method according to the invention and/or the drive control system allow the driver to remotely control the motor vehicle or the big rig 3 by way of the touchscreen device 1, which can be implemented as a smart phone, tablet PC or the like, for example. Since the driver leaves the vehicle and controls the motor vehicle or the big rig 3 from outside, he can gain an optimal overview of the surroundings of the big rig during maneuvering. So as to facilitate the driver's orientation, a big rig 3, or a portion of a big rig 3, is virtually or stylistically represented from a bird's eye view on the touchscreen 2. The driver can thus easily align the touchscreen device 1, so that the virtual big rig 3 is aligned the same way as the real big rig (not shown). This enables safe and convenient maneuvering of the big rig.

A further variant of a method according to the invention for controlling driving, of a touchscreen device, and of a drive control system, is provided hereafter in sentences, which do not constitute any claims.

a) A method for controlling the driving of a big rig comprising a tractor unit and one or more trailers coupled to the tractor unit, wherein the tractor unit comprises a drive train, which can be electronically actuated by control means of the tractor unit and by way of which the tractor unit can be driven automatically, and wherein the control means of the tractor unit have a wireless communication link to a touchscreen device so that automatic driving of the big rig can be remotely controlled by way of the touchscreen device, during which at least one articulation angle between a longitudinal axis of the tractor unit and a longitudinal axis of the trailer is continuously regulated.

b) The method according to sentence a), wherein the big rig is graphically represented on the touchscreen of the touchscreen device, in particular in a top view from above.

c) The method according to sentence a) or b), wherein a driving direction and/or a driving speed of the big rig are predefined on the touchscreen of the touchscreen device prior to starting to drive.

d) The method according to sentence a), b) or c), wherein the tractor unit comprises at least one transceiver system, which is electrically connected to the control means of the tractor unit and which is suitable for communicating with a transceiver system of the touchscreen device.

e) A method according to any one of sentences b) to d), wherein the graphical representation of the big rig on the touchscreen of the touchscreen device comprises at least one active part and at least one passive part.

f) The method according to sentence e), wherein, when the big rig is being backed up, the at least one active part on the touchscreen of the touchscreen device is a trailer, and the at least one passive part is the tractor unit, or a further trailer if multiple trailers are present.

g) The method according to sentence e) or f), wherein, when the big rig is being driven forward, the at least one active part on the touchscreen of the touchscreen device is the tractor unit, and the at least one passive part is at least one trailer.

h) The method according to sentence e), f), or g), wherein, when a user touches the at least one active part on the touchscreen of the touchscreen device, the touchscreen device remotely controls the control means of the tractor unit so that the big rig is set in motion in a predefined driving direction, and in particular at a predefined driving speed.

i) A method according to any one of sentences e) to h), wherein a user predefines a lateral movement direction of the big rig, in particular in the form of a target articulation angle between the active part and the passive part, by laterally displacing the at least one active part on the touchscreen of the touchscreen device.

j) A method according to any one of sentences e) to i), wherein a target articulation angle between the active part and the passive part is calculated from a lateral position of the displaced active part on the touchscreen of the touchscreen device, the following applying: lateral position of the displaced active part/maximal lateral position of the displaced active part=target articulation angle/maximal articulation angle.

k) A method according to any one of sentences e) to j), wherein, during driving, a user sets a driving speed by longitudinally displacing the at least one active part on the touchscreen of the touchscreen device.

l) A method according to any one of sentences e) to k), wherein, when the user ceases to touch the at least one active part, the control means of the tractor unit are actuated by the touchscreen device so that the tractor unit is immediately stopped m) A method according to any one of sentences a) to l), wherein the control means of the tractor unit transmit at least one activation status to the touchscreen device.

n) A method according to any one of sentences a) to m), wherein at least one predefined driving direction, a predefined driving speed, a target articulation angle, and an activation status are transmitted from the touchscreen device to the control means of the tractor unit.

o) A method according to any one of sentences a) to n), wherein the big rig comprises multiple trailers, and wherein additionally at least one articulation angle between the longitudinal axes of the respective trailers that are coupled to each other is continuously regulated when the big rig is being driven automatically.

p) A method according to any one of sentences a) to o), wherein the at least one articulation angle is limited while the big rig is being driven.

q) A method according to any one of sentences a) to p), wherein the at least one articulation angle is automatically regulated during driving by way of a steering system of the electronically actuatable drive train of the tractor unit.

r) A touchscreen device, configured for use in a method according to any one of sentences a) to q).

s) A drive control system for a big rig comprising a tractor unit and one or more trailers coupled to the tractor unit, in conjunction with a touchscreen device for use in a method according to any one of sentences a) to q), wherein the tractor unit comprises a drive train, which can be electronically actuated by control means of the tractor unit and by way of which the tractor unit can be driven automatically, and wherein the control means of the tractor unit have a wireless communication link to the touchscreen device so that automatic driving of the big rig can be remotely controlled by way of the touchscreen device, during which at least one articulation angle between a longitudinal axis of the tractor unit and a longitudinal axis of the at least one trailer is continuously regulated.

LIST OF REFERENCE NUMERALS 1 touchscreen device
2 touchscreen
3 big rig
4 tractor unit
4a longitudinal axis of the tractor unit
5 trailer
5a longitudinal axis of the trailer
6a, 6b areas for movement direction
v1 to v4 speed levels
$\phi_{TARGET}$ target articulation angle
y lateral position of the active part
$y_{max}$ maximal lateral position of the active part

The invention claimed is:

1. A method for controlling the driving of a motor vehicle, the motor vehicle comprising a tractor unit and at least one trailer, the tractor unit comprising a steering system, a drive train, and an electronically-actuated controller configured to allow automatically driving the motor vehicle by remote control from a touchscreen device wirelessly linked to the electronically-actuated controller, the method comprising:

displaying on the touchscreen device a first graphical representation of the tractor unit and a second graphical representation of the at least one trailer, wherein one of the first graphical representation and second graphical representation is an active part configured for responding to user touch inputs and another of the first graphical representation and second graphical representation is a passive part unresponsive to user touch inputs, wherein during remote control of driving in a forward direction the first graphical representation is said active part, and wherein during remote control of driving in a reverse direction the second graphical representation is said active part; and responding to said user touch input to said active part of the touchscreen device which the active part is moved on the touchscreen display relative to the passive part by communicating commands from the touchscreen device to the electronically-actuated controller over a wireless link for remotely controlling driving of the motor vehicle.

2. The method according to claim 1, wherein said communicating commands comprises communicating commands to continuously regulate at least one articulation angle between a longitudinal axis of the tractor unit and a longitudinal axis of at least one of said at least one trailer.

3. A method according to claim 2, wherein a lateral position (y) of a displaced active part divided by a maximal lateral position $y_{max}$ of the displaced active part equals a target articulation angle $\phi_{TARGET}$ divided by a maximal articulation angle.

* * * * *